Patented Aug. 31, 1954

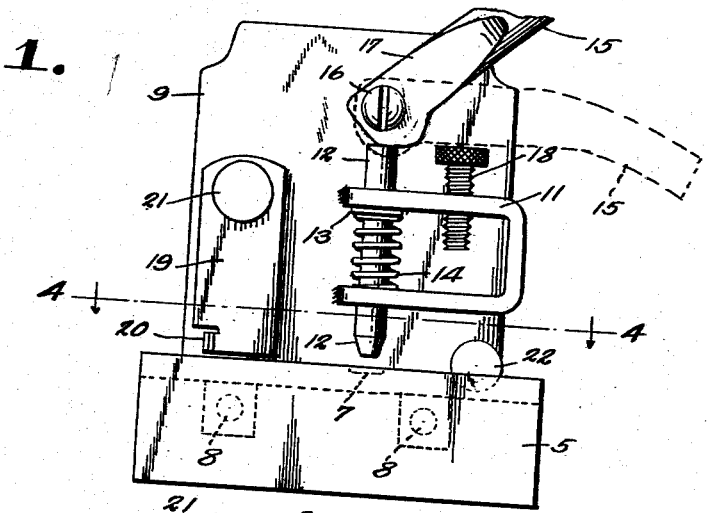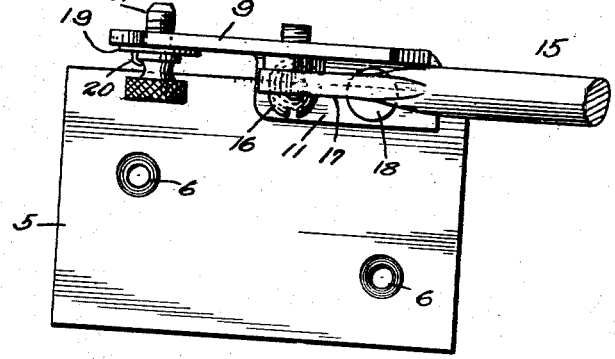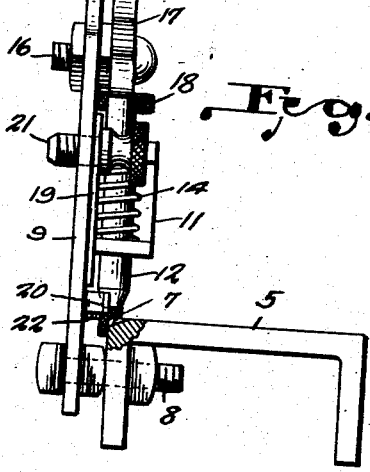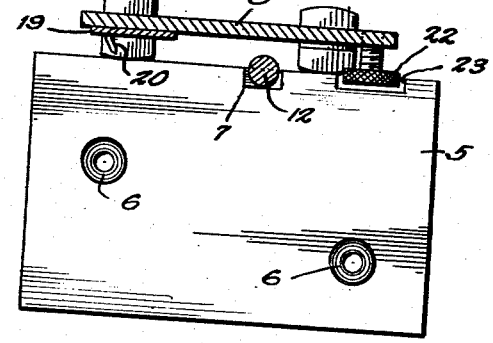

2,687,659

UNITED STATES PATENT OFFICE 2,687,659

SAW SET

William E. Rice, Avilla, Mo.

Application January 3, 1952, Serial No. 264,756

2 Claims. (Cl. 76—68)

This invention relates to a saw set, the primary object of the invention being to provide a saw set which may be clamped to the usual work bench, the saw set having adjusting means whereby the saw set may be used for accurately and effectively setting saw teeth of fine or large toothed saws.

Another object of the invention is to provide a saw set having means for gauging the positioning of the saw within the saw set to insure the accurate location of the saw teeth within the saw set directly under the movable plunger of the saw set.

Still another object of the invention is to provide means for varying the throw of the operating lever, thereby regulating the distance of movement of the plunger to control the setting operation of the plunger, according to the size of the saw and saw teeth being set.

With the foregoing and other objects in view which will appear as the description proceeds, the invention consists of construction and combinations of parts hereinafter more fully described and pointed out in the claims, it being understood that changes may be made in the construction and arrangement of parts without departing from the spirit of the invention as claimed.

Referring to the drawing,

Figure 1 is a front elevational view of a saw set, constructed in accordance with the invention, the plunger of the saw set being in position to permit a saw to be inserted thereunder.

Fig. 2 is a plan view thereof.

Fig. 3 is a side elevational view of the saw set.

Fig. 4 is a sectional view taken on line 4—4 of Fig. 1.

Referring to the drawing in detail, the saw set comprises the base 5 which is provided with openings 6 through which suitable securing screws may be positioned for securing the saw set to a supporting surface.

The base is constructed preferably of channel bar material, and when positioned on a supporting surface, has its open side disposed towards the supporting surface.

One edge of the base is provided with a recess 7 which is formed with a downwardly inclined surface, and constitutes the anvil of the saw set.

Rising from the rear edge of the base 5, and secured thereto by means of the bolts 8, is the vertical plate 9, there being provided spaces 10 disposed between the plate 9 and one edge of the base 5 for holding the vertical plate 9 in proper spaced relation with respect to the base 5.

This vertical plate 9 provides the support for the U-shaped bracket 11 which is welded to the front surface of the vertical plate 9, as shown by the drawing.

This U-shaped bracket 11 is formed with aligning openings in the arms thereof, which openings provided bearings for the vertically movable plunger 12, which is provided with the cotter 13, secured thereto against which the upper end of the coiled spring 14 engages, the lower end of the coiled spring 14 resting on the upper surface of the lower arm of the bracket 11. Thus it will be seen that due to this construction, the normal tendency of the spring 14 is to urge the plunger 12 upwardly so that the lower setting end of the plunger will normally lie in spaced relation with the upper surface of the base 5.

It will be noted that the location of the plunger 12 is directly over the recess 7 so that when a saw is positioned with its tooth to be set, over the recess, the plunger will, on its downward movement, contact the tooth and bend the tooth into the recess, setting the tooth as desired.

Pivotally mounted directly above the upper end of the plunger 12, is the operating lever 15 which is connected with the vertical plate 9 by means of the bolt 16 which passes through an opening in the flattened portion 17 of the lever, the opening being eccentrically formed so that when the lever is in its upstanding or inactive position, the lever while it contacts with the upper end of the plunger 12, will not exert pressure on the plunger 12 until the lever is moved from the position shown in full lines in Fig. 1 of the drawing, to the position shown in dotted lines, whereupon the plunger is forced downwardly due to the wide portion of the lever beyond the pivot, engaging the upper end of the plunger and acting as a cam to move the plunger downwardly.

Mounted on the upper arm of the U-shaped bracket 11, is the set screw 18 which is so disposed that it lies within the path of travel of the swinging lever 15 from its vertical position to its horizontal position at the righthand side of the saw set. This set screw 18, because of its position on the U-shaped bracket, acts as a stop to limit the pivotal movement of the operating lever 15, and consequently limiting the movement of the plunger 12. This is necessary, since by adjusting the set screw 18, the plunger may be controlled to permit its use in setting teeth of saws of various sizes.

The reference character 19 indicates a pivoted gauge arm which is provided with the forwardly extended lip 20 that is designed to fit in the gullet between the teeth of the saw, so that when the saw is positioned with the lip 20 within the gullet between teeth, the saw will be correctly located so that the tooth to be set will fall directly over the recess 7 and under the plunger 12 to insure the true operation of the setting of the saw tooth.

The set screw 21 connects the pivoted gauge arm 19 to the vertical plate 9 and affords means whereby the arm 19 may be swung laterally to adjust the position of the arm for a particular type of saw tooth.

Also positioned in a threaded opening of the plate 9, is the screw 22, which screw 22 moves into the notch 23 formed in one edge of the base or anvil 5, the set screw providing a stop against which teeth of the saw may engage to permit the saw set to be used with fine or large toothed saws. By moving the set screw 22 towards the plate 9, it will be obvious that the clearance between the pointed ends of the saw teeth of the saw may be increased to compensate for large toothed saws, while by moving the set screw in the opposite direction or towards the base 5, the distance between the saw teeth and the plate 9 may be reduced so that when the teeth are positioned against the set screw 22 the saw teeth being set will be held securely during the setting operation.

In operation, a saw to be set is positioned with a tooth resting directly over the recess 7. It will of course be understood that the pivoted arm 19 and screw 22 will be adjusted so that when a saw tooth is positioned over the recess, the saw will be properly held in place on the base against movement. The operating reel 15 is now swung to a position to the right of the saw set, which movement causes the wide portion of the pivoted end of the lever 15 to move over the upper end of the plunger 12, moving the plunger 12 downwardly against the action of the coiled spring 14 and exerting pressure on the tooth forcing the tooth into the recess, moving the tooth laterally of the saw blade providing the proper set for the tooth.

It will then be understood that the saw is moved along the base, skipping the adjacent saw tooth. With the saw tooth adjacent to the tooth skipped, disposed directly under the plunger 12 and resting over the recess, the lever is again moved downwardly to the right, causing the plunger 12 to press the saw tooth lying directly thereunder, to set the saw tooth.

It will be obvious that when alternating saw teeth of a saw blade have been set, the saw will be reversed and the remaining teeth set in the same manner as described.

It is believed in view of the foregoing drawing and description, the structure and operation of the saw set forming the subject matter of this invention will be obvious and that further description as to the operation and structure is unnecessary.

Having thus described the invention, what is claimed is:

1. In a saw set, an anvil of inverted U-shape construction having a notch formed in the upper edge thereof, a plate rising from one side edge of the anvil adjacent to the notch and spaced from the edge of the anvil, a vertically movable plunger mounted on the plate, a spring mounted on said plunger normally biasing the plunger upwardly away from said anvil, operating directly over the notch with one end of the plunger movable into the notch adapted to engage and set a saw tooth positioned over said notch, a lever pivotally mounted on the plate movable into engagement with the plunger effecting downward movement of the plunger against the saw tooth, and a vertically adjustable screw mounted on the plate lying in the path of downward travel of said lever for restricting downward movement of the lever regulating the setting of the saw tooth positioned thereunder.

2. In a saw set, an anvil having a notch formed adjacent to one edge thereof, a vertically movable plunger operating directly over said notch for engaging the teeth of a saw resting over said notch, a pivoted gauge arm disposed vertically and secured to said plate with a portion thereof disposed inwardly terminating adjacent to the anvil, a lip extending forwardly from said gauge arm adapted to engage between teeth of the saw being set, normally holding the saw against longitudinal movement on said anvil, and an adjustable member for engaging the teeth of the saw restricting movement of the teeth towards said plate during the tooth setting operation.

References Cited in the file of this patent

UNITED STATES PATENTS

| Number | Name | Date |
|---|---|---|
| 77,825 | Lyon et al. | May 12, 1868 |
| 120,243 | Clark | Oct. 24, 1871 |
| 134,320 | Shoemaker | Dec. 24, 1872 |
| 148,576 | Reite | Mar. 17, 1874 |
| 330,499 | Laybolt | Nov. 17, 1885 |
| 465,581 | Messer | Dec. 22, 1891 |
| 581,245 | Bowles | Apr. 20, 1897 |
| 591,478 | Kidwell | Oct. 12, 1897 |
| 1,258,734 | Anderson et al. | Mar. 12, 1918 |
| 2,238,405 | Vaipan | Apr. 15, 1941 |
| 2,336,972 | Vaipan | Dec. 14, 1943 |